Oct. 15, 1974  G. L. VOLLERS  3,842,149
METHOD FOR BLOW PIN ACTUATION IN INJECTION BLOW MOLDING
Original Filed June 16, 1971
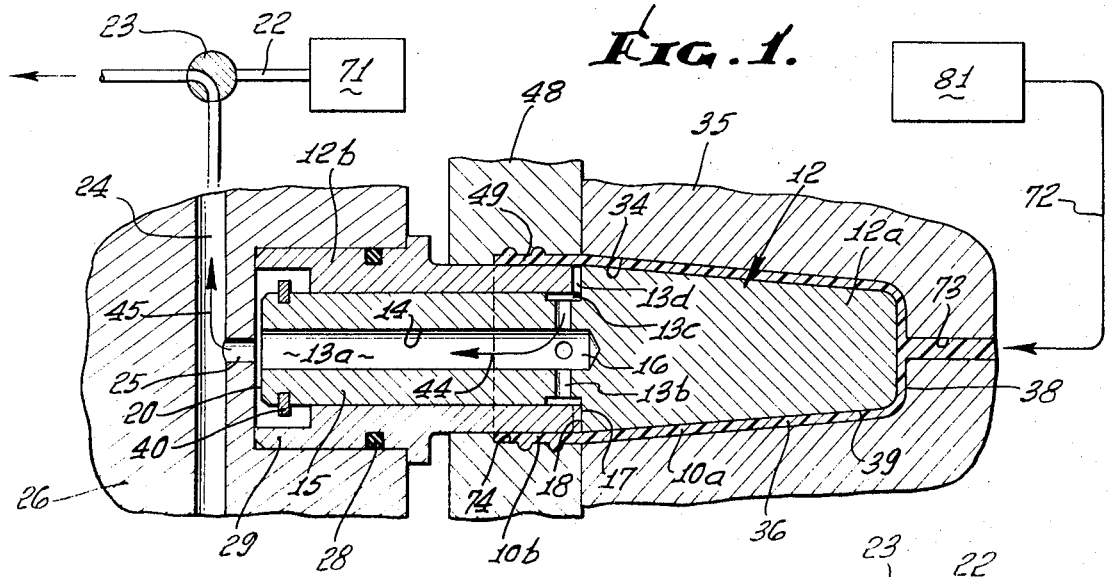
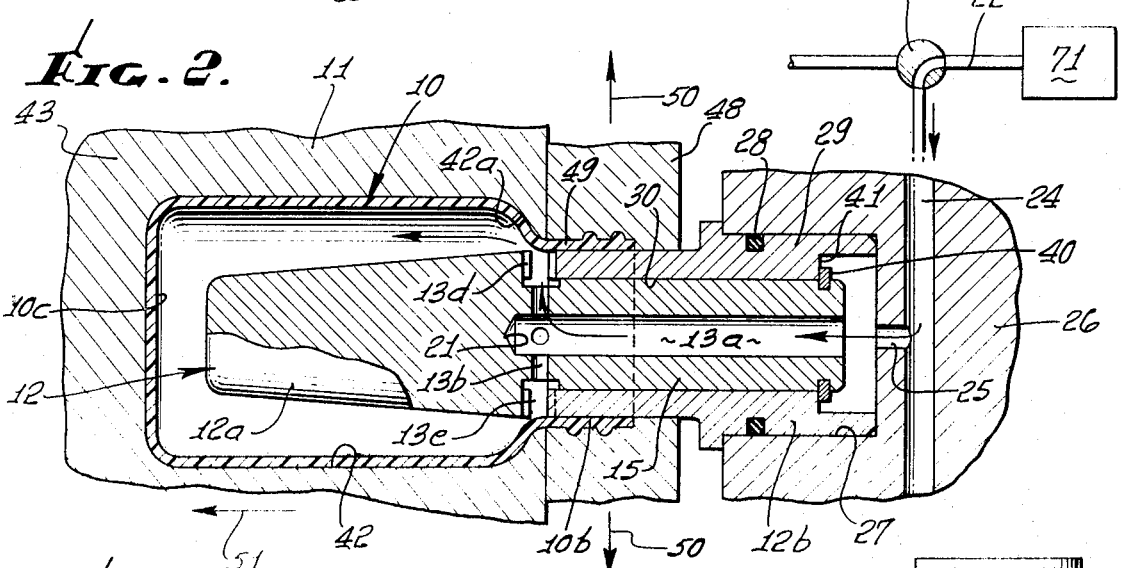
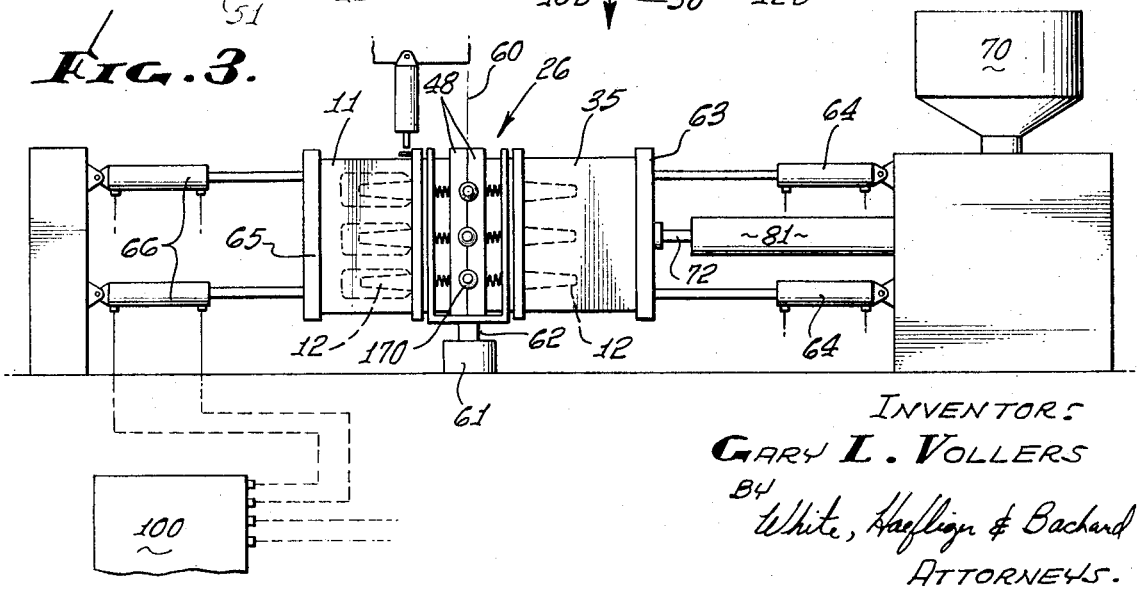

United States Patent Office 3,842,149
Patented Oct. 15, 1974

3,842,149
METHOD FOR BLOW PIN ACTUATION IN INJECTION BLOW MOLDING
Gary L. Vollers, Upland, Calif., assignor to Trans Container Corporation, Los Angeles, Calif.
Continuation of abandoned application Ser. No. 153,689, June 16, 1971. This application Apr. 11, 1973, Ser. No. 349,954
Int. Cl. B29c 17/07
U.S. Cl. 264—97      2 Claims

ABSTRACT OF THE DISCLOSURE

The invention is embodied in the principle of using the same gas or air feed the blows an article or container to actuate the opening of blow pins. Also, the pressure of injected plastic is used to actuate the pin toward near closed position. The utilized blow pin contains flow porting for passing blow gas through the pin for application to the article. In operation, the restriction to gas flow through that porting is reduced in response to blow gas pressure application for flow through the porting; and the pin may include sections that are relatively movable, one section being responsive to blow gas pressure application to move from relatively collapsed condition to relatively expanded condition. Further, the value or porting area of the blow pin may be vented for escape of air when blow pressure is relieved.

---

This is a continuation of application Ser. No. 153,689, filed June 16, 1971, now abandoned.

BACKGROUND OF THE INVENTION

This invention relates generally to the art of blow molding, and more particularly concerns method for using pressure generated by injected plastic and blow gas to actuate a blow pin.

In the process of plastic injection blow molding, a hot parison is formed around the blow pin in the parison mold. The pin and parison are together transferred to a blow station where the pin is mechanically pushed open to allow the passage of air through the pin for application to the parison. The hot parison is thus blown to the shape of the blow mold, and an article such as a container is produced. This procedure typically requires the use of mechanical equipment such as an air manifold, actuator pins, air seals, springs and a complex blow pin assembly, all for the purpose of moving the blow pin back and forth. In operation, air is passed through the manifold, which in turn must be mechanically actuated to open a bank of blow pins mounted on a common plate, for which a spring return is provided. Since apparatus suffers from undesirable complexity, excessively high tooling cost, and substantial potential for malfunction.

SUMMARY OF THE INVENTION

It is a major object of the invention to provide method for overcoming the above described disadvantages with prior injection blow molding processes and equipment. Basically, the invention is embodied in the principle of using the same gas or air feed that blows the article or container to actuate the opening of the blow pins, in an unusually advantageous manner. Also, the pressure of injected plastic is used to actuate the pin toward near closed position.

In its basic method aspects, the utilized blow pin contains flow porting for passing blow gas through the pin for application to the article. In operation, the restriction to gas flow through that porting is reduced in response to blow gas pressure application for flow through the porting, and in this regard the pin may include sections that are relatively movable, one section being responsive to blow gas pressure application to move from relatively collapsed condition to relatively expanded condition. Further, the valve or porting area of the blow pin may be vented for escape of air when blow pressure is relieved.

Additionally, the method may include the step of effecting relative movement of the sections to collapsed condition by transmitting force to the one section from plastic undergoing injection forming of a parison about the blow pin.

In its basic apparatus aspects, the invention may comprise a blow pin containing flow porting for passing blow gas through the pin for application to a plastic article; and, the pin having means responsive to blow gas pressure application to reduce the restriction to gas flow through the porting in response to blow gas pressure application. As will be seen, the pin may comprise sections relatively movable to valve control the porting, one section having a piston surface on a plunger movable within the other section when blow gas pressure is applied to that surface, thereby to increasingly open the porting outlet to the pin exterior for expanding the parison during blowing. Conversely, when the sections are relatively collapsed as during parison formation, the porting outlet is reduced to a width such as will obviate fouling of the outlet and porting by injected plastic, the pressure of the injected plastic urging that one section to relatively collapsed or retracted condition.

These and other objects and advantages of the invention, as well as the details of an illustrative embodiment, will be more fully understood from the following description and drawings in which:

DRAWING DESCRIPTION

FIG. 1 is a side elevation taken in section, showing a retracted blow pin embodying the invention;

FIG. 2 is a view like FIG. 1, but showing the pin in extended condition; and

FIG. 3 is a side elevation showing one form of plastic article forming apparatus in which the invention may be incorporated.

DETAILED DESCRIPTION

In accordance with the invention, apparatus for rapidly forming plastic articles, as for example a blown container seen at 10 in a blow mold 11 in FIG. 2, comprises a blow pin containing flow porting for passing blow gas through the pin for application to a plastic article; and, the pin includes means responsive to blow gas pressure application to reduce the restriction to gas flow through the porting in response to blow gas pressure application.

In the example, a blow pin 12 includes sections such as at 12a and 12b that are relatively movable to valve control through porting illustratively seen at 13a, 13b, 13c and 13d. Elongated port 13a is formed by axial bore 14 formed in plunger stem portion 15 of section 12b; and radial ports 13b are also formed in that section proximate the nose portion 16 thereof. Ports 13b communicate between port 13a and manifold ring port or groove 13c sunk in the periphery of plunger portion 15, and gas outlet porting 13 may comprise spaced radial ports 13d that communicate between port 13c and the exterior of the blow pin, plus the annular gap 13e between end shoulder 17 on section 12b, and end shoulder 18 on section 12a.

It will be seen that the outlet porting has minimum cross-sectional area defined by ports 13d in the radial direction of gas flow therethrough when the pin section is relatively collapsed as during parison injection seen in FIG. 1, whereas the outlet porting has maximum cross-sectional area (area of 13d plus 13e) when that pin section is relatively extended as during the blowing mode viewed in FIG. 2. In accordance with the invention, the restriction to gas flow through the outlet is reduced to flow through ports 13d and 13e in response to blow gas pressure application for flow through the porting 13a–13e, as for example by such pressure application to shift the pin section 12a from retracted to extended condition. For this purpose, one section (section 12a for example) may have thereon piston surfaces as at 20 and 21 to receive blow gas pressure application communicated from source 71 via line 22, valve 23, and ducting 24 and 25 in support 26. The latter may advantageously comprise a rotary carriage and support multiple similar blow pins as will be described.

FIGS. 1 and 2 also show pin section 12b having a base 29 received in bore 27 formed in support 26, and O-ring seal 28 sealing off between the bore 29 and base 27. Plunger portion 15 of section 12a slidably fits in bore 30 formed by section 12b. Back and forth sliding or movement of the section 12a relative to section 12b is limited to a predetermined range corresponding to the maximum and minimum cross sectional area or width of outlet porting 13d and 13e.

Thus, in FIG. 1, end shoulder 18 on section 12a engages end shoulder 17 on section 12b to limit relative retraction of the sections so that a minimum width opening of ports 13d allows escape of air from the parison cavity 34 of the injection mold 35. In this regard, reliance is placed on the pressure generated by the injected plastic parison material 36 to displace pin section 12a to the left in FIG. 1 and to the position shown, by leftward force application to rightward facing surface extend of the section 12a. Thus, in the example shown, leftward force is applied to piston face 38 and rightwardly tapered annular surface 39 of section 12a. The cross sections of outlets 13d should not be so great, however, that injected plastic material undesirably plugs those outlets and interferes with the blowing step or venting of gas.

In FIG. 2, snap ring 40 on stem 15 engages end shoulder 41 on base 29 to limit relative expansion of sections 12a and 12b, so that the outlets 13d and 13e have sufficient width and annular opening to allow inrush of blowing gas or air into the parison within the cavity 42 of blow mold 43. In this regard, the blow pin and parison thereon have been transferred from the injection mold 35 to the blow mold 43, and reliance is placed on the pressure generated by the blow gas to displace the pin section 12a to the left in FIG. 2 and to the position shown, by force application. Annular outlet port 13e has a fully opened width or cross section to allow full inrush of gas to blow the parison to container shape 10. At the same time, the outlet 13e is sufficiently narrow as to close in sufficient time to prevent plugging thereof by injected plastic in the parison mold. Also, outlets 13d are small enough to prevent their plugging by injected plastic material.

In FIG. 1, the escaping air flowing in the direction of arrow 44 flows at 45 via ducting 24 to valve 23 shifted to exhaust position, as shown.

It should be noted that the mold structure illustrated includes container neck molds 48 for forming threaded neck portion 49 of the container 10. Outlet 13e is located in such relation to the molds 43 and 48 that blow gas escaping via annularly opened outlet 13e in FIG. 2 initially forces the plastic material progressively along the shoulder curvature 42a of the cavity, in the direction of opening of the port 13e as section 12a moves to the left, whereby a progressive blow molding of the container occurs from neck 49 toward the container base 10b. Neck molds 48 are retained on the carriage 26, but are oppositely retracted in the direction of arrows 50 just prior to relative withdrawal of the container 10 off the blow pin in the direction of arrow 51.

The invention has especially advantageous application to equipment of the type described in my co-pending application for U.S. Letters Patent, Ser. No. 885,076, incorporated by reference. As described therein, and with reference to FIG. 3 herein, the general organization illustrated includes a carriage 26 rotatable about a vertical axis 60 as by means of a drive 61 that includes an axle 62. A suitably heated parison forming mold 35 is supported by platen 63 and horizontal actuator means 64 to be horizontally advanced toward the carriage to receive blow nozzles 12, and to be relatively retracted away from the carriage to free the nozzles for rotary indexing with the carriage. A blow mold 11 is likewise supported by a platen 65 and horizontal actuator means 66 to be horizontally advanced toward the carriage to receive blow nozzles 12 and to be relatively retracted away from the nozzles to free them for indexing. In addition, oppositely extending sets of nozzles are located at 170 whereby the sets 17, 170, and 20 project outwardly from carriage 26 at 90 degree intervals about axis 60. Carriage rotation is interrupted after each 90 degrees of rotation of the carriage about axis 26, so that parison forming, cooling, blowing and nozzle cooling steps may be carried out simultaneously, for rapid production rates. A controller for all the drives described and to be described is shown at 100, and may be automatic or hand-operated.

The parison forming mold 35 is shown advanced relatively to the left to engage the split neck ring or molds 48 retained on the carriage 26. In this position, the nozzles or blow pins 12 project horizontally to the right into the forming cavities in mold 35. Synthetic resinous thermoplastic material, as for example high density polyethylene, styrene or vinyl supplied via hopper 70 is extruded at 81 into the cavities via line 72 and passages 73 in the mold. Plastic material is also extruded into the neck ring cavities 74, which may be threaded as shown, whereby the formed parison includes integral body and neck portions 10a and 10b. FIG. 3 also shows the blow molding chamber 11 advanced against the neck molds 48 at the left side of the carriage.

Following such parison formation, gas is blown into the parison body portions for effecting expansion thereof into container body shape, while maintaining the neck ring closed about the parison body portions. Prior to such blowing, however, the molds 11 and 35 may be relatively retracted horizontally away from the carriage, and the latter rotated approximately 180 degrees in two 90 degree steps about axis 60 to bring the parison supporting nozzle opposite mold 11, and free nozzles opposite mold 35. In the meantime, the parisons are cooled to reduce their body temperatures to predetermined lesser level substantially below parison forming temperature. For example, parison forming temperature may be between 360° F. and 400° F.; and the parisons may be cooled to between 260° F. and 300° F. after leaving the forming mold and prior to arrival at the blow mold. Their temperature at the blow mold is above, but less than about 20° F. above, the critical level at which a further reduction in temperature prevents complete expansion of the parison to container body shape. Such cooling may be effected by jetting of cool gas streams onto the heated parisons during interrupted rotation; however, sufficient cooling may occur during dwell, and without gas jetting.

It will be noted that the retention of the parison neck portions by closed neck molds 48 assures freeing of the formed parison from injection mold cavities during relative retraction thereof by the blow mold. The latter may be split into sections, which are retracted away from the sides of the blown container during retraction thereof off the blow pins, thereby to release the containers to drop into bins.

I claim:

1. In the method of rapidly forming plastic containers using a blow pin containing flow porting for passing blow gas through the pin for application to the article, the pin including first and second sections that are relatively movable to valve control the porting, the second section being tubular and having a bore and the first section including a tubular plunger slidable within said bore and a portion projecting from and second portion, said porting having radial extent between said sections, the steps that include (a) forming a plastic parison about said projecting portion of the first section and about said porting at the periphery of the second section thereby effecting relative movement of said sections to fully collapsed condition and reduction in cross-sectional area of said porting radial extent, and positively blocking at the porting said section relative movement to prevent complete closure at all times of said porting radial extent to allow gas flow radially inwardly from the periphery of the second section to the interior of the plunger, said forming step being carried out by relatively inserting the pin into an injection mold cavity prior to said injection forming, said injection forming being carried out to fill the cavity about the pin with injected plastic material under pressure and to an extent overlying the partly open porting at the pin exterior, said relative movement being carried out by transmitting force to said first section from said injected plastic material, said porting communicating with the exterior of the blow pin being maintained in such near closed position by maintenance of said sections in said collapsed condition that plugging thereof by the injected plastic is precluded, and (b) withdrawing the pin and formed plastic parison thereon from the injection mold cavity and relatively inserting the pin with a formed plastic parison thereon into a blow mold cavity, and while the sections remain in said fully collapsed condition, and thereafter applying blow gas pressure to said first section plunger to effect relative movement of the first section from fully collapsed to extended position relative to the second section thereby increasing the opening of said porting, and continuing said blow gas pressure application to flow through the pin via the increasingly opened porting to the pin exterior to expand the parison into container shape, the sections during said forming and withdrawal steps and prior to said blow pressure application being maintained free for said relative movements under the influence of pressures exerted by blow gas and injected plastic parison material.

2. The method of claim 1 including the step of cooling the formed plastic parisons in air outside the injection mold cavity and prior to insertion into the blow mold cavity.

References Cited
UNITED STATES PATENTS

| | | | |
|---|---|---|---|
| 3,526,687 | 9/1970 | Valyi | 264—97 |
| 3,412,186 | 11/1968 | Piotrowski | 264—97 XR |
| 3,347,965 | 10/1967 | Valyi | 264—97 |
| 3,707,591 | 12/1972 | Chalfant | 264—97 |

JAN H. SILBAUGH, Primary Examiner

U.S. Cl. X.R.

425—DIG. 209